US008656204B2

United States Patent
Osen et al.

(10) Patent No.: US 8,656,204 B2
(45) Date of Patent: *Feb. 18, 2014

(54) SECURITY DEVICE MEANT TO BE CONNECTED TO A PROCESSING UNIT FOR AUDIO/VIDEO SIGNAL AND METHOD USING SUCH A DEVICE

(75) Inventors: Karl Osen, Dardagny (CH); Nicolas Fischer, Versoix (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 683 days.

This patent is subject to a terminal disclaimer.

(21) Appl. No.: 12/801,804

(22) Filed: Jun. 25, 2010

(65) Prior Publication Data

US 2011/0010574 A1   Jan. 13, 2011

Related U.S. Application Data

(63) Continuation-in-part of application No. 11/802,662, filed on May 24, 2007, now Pat. No. 8,037,339.

(30) Foreign Application Priority Data

Jun. 1, 2006   (EP) .................................. 06114849

(51) Int. Cl.
G06F 1/04       (2006.01)
G06F 15/177   (2006.01)

(52) U.S. Cl.
USPC .............................. 713/501; 713/1; 713/600

(58) Field of Classification Search
None
See application file for complete search history.

(56) References Cited

U.S. PATENT DOCUMENTS

| 8,037,339 | B2 * | 10/2011 | Osen et al. ...................... | 713/501 |
| 2004/0089725 | A1 | 5/2004 | Hill | |
| 2004/0134992 | A1 | 7/2004 | Guez | |
| 2004/0178276 | A1 | 9/2004 | Fruhauf et al. | |
| 2004/0249625 | A1 | 12/2004 | Leaming | |
| 2005/0081076 | A1 | 4/2005 | Okuda | |
| 2007/0158439 | A1 | 7/2007 | Conner et al. | |
| 2008/0063129 | A1 * | 3/2008 | Voutilainen ................... | 375/376 |
| 2009/0113116 | A1 * | 4/2009 | Thompson et al. ........... | 711/103 |

FOREIGN PATENT DOCUMENTS

| EP | 1 457 922 | 9/2004 |
| JP | 2004280817 A | 10/2004 |
| KR | 102003003000 A | 4/2003 |
| WO | WO-0223472 A1 | 3/2002 |

* cited by examiner

*Primary Examiner* — Dennis M Butler
(74) *Attorney, Agent, or Firm* — Harness, Dickey & Pierce, P.L.C.

(57) ABSTRACT

Example embodiments relate to a security device having two communication interfaces sharing at least one pin, each interface being capable of operating according to either of two predetermined communication protocols. The security device may further include a frequency detector to detect the frequency of a clock signal on the shared pin. Depending on the value of the detected frequency, and to which of a plurality of predetermined frequency ranges the detected frequency pertains, the security device may function according to one of the two predetermined communication protocols, operating at two different frequencies.

14 Claims, 2 Drawing Sheets

SECURITY DEVICE MEANT TO BE CONNECTED TO A PROCESSING UNIT FOR AUDIO/VIDEO SIGNAL AND METHOD USING SUCH A DEVICE

CROSS REFERENCE TO RELATED APPLICATION

This application is a continuation-in-part application of U.S. patent application Ser. No. 11/802,662 filed on May 24, 2007, now U.S. Pat. No. 8,037,339, the entire contents of which is herein incorporated by reference in its entirety.

TECHNICAL DOMAIN

The present invention relates to the domain of access to conditional access data, in particular of the audio/video type, intended among other for Pay-TV. More particularly, it concerns a security device intended to be connected to a processing unit for an audio/video signal, this device comprising means to decrypt an audio/video stream, an interface of the ISO 7816 type and a high speed serial communication interface.

The present invention also relates to a process for processing an audio/video signal by means of a device comprising means to decrypt an audio/video stream, an interface of the ISO 7816 type and a high speed serial communication interface.

TECHNICAL BACKGROUND

As it is well known, in order to be able to access encrypted data and visualise a Pay-TV event, such as a film, a sports event or a game in particular, several streams are broadcast to a set of multimedia units comprising a decoder and a security module. In particular, these streams are on one hand the file of the event in the form of an encrypted data stream and on the other hand, a stream of control messages ECM allowing the data stream to be decrypted. The content of the data stream is encrypted by "control words" (Control words=CW) that are regularly renewed. The second stream is called ECM (Entitlement Control Message) and can be formed in particular in two different ways. According to a first method, the control words are encrypted by a key, called transmission key TK, which generally pertains to the transmission system between the management centre and a security module associated with the receiver/decoder. The control word CW is obtained by decrypting the control messages ECM by means of the transmission key TK.

According to a second method, the ECM stream does not directly contain the encrypted control words, but rather contains information allowing the determination of the control words. This determination of the control words can be carried out by different operations, in particular by a decryption, this decryption can lead directly to the control word, but can also lead to data which contains the control word, which must then be extracted from the data. In particular, the data can contain the control word as well as a value associated to the content to be broadcast, and in particular the access conditions to this content. Another operation allowing the determination of the control word can use, for example, a one-way hashing function of this data in particular.

In the majority of the present systems, the data stream is received in encrypted form by the decoder. This also receives the stream of control messages ECM. It transmits these messages ECM to the security module that decrypts them in order to extract the control words CW. These control words are transmitted to the decoder, for example in the encrypted form by means of a key common to the security module and to the decoder. The decoder contains a descrambling module (Descrambler) responsible for the decryption of the data stream with the aid of the control words.

During the decryption of a control message ECM, it is also verified, in the security module, that the right to access the content in question is present. This right can be managed by authorisation messages EMM (Entitlement Management Message) that load this right into the security module.

The encryption key of the control messages is itself transmitted in authorisation messages EMM, in order to allow access to the control words.

At present, a large number of the security modules used in access systems to conditional access data and in particular in the systems related to Pay-TV are smart cards. Generally, the used smart cards fulfil the ISO 7816 standard. As it is well known, the cards conforming to this standard comprise eight contacts accessible from the exterior by means of elements which form an electric junction with the contacts of the card when the latter is inserted into a reader. Six of the eight contacts have a function well defined in the ISO 7816 standard mentioned above. In particular, a contact Vcc is responsible for providing the power supply of the card's chip, a contact GND provides the grounding of this chip, a contact RST allows resetting, a contact Vpp provides the supply of the chip in programming voltage, a contact CLK allows the input of a clock signal and a contact I/O allows the input/output of the data.

These cards are particularly adapted to a Pay-TV system since they allow the security required for this type of application to be provided. However, they suffer from a defect. They do not allow significant data processing speeds. Thus, when such cards are used to decrypt control messages ECM in order to extract the control words, their processing capacity is sufficient. However, such cards are not capable of decrypting streams as large as data streams.

At present there are cards capable of supporting two different operating modes, in particular one mode responding to the ISO 7816 standard and another mode using a high speed serial communication protocol such as the USB protocol. This USB protocol allows sufficiently fast rates to be applied to the data decryption on-the-fly.

In the smart cards conforming to the ISO 7816 standard, two contacts of the eight existing are not reserved for a precise function, but can be used according to the requirements of the application. According to the USB standard, the data is transmitted by two wires, D+ and D−, two other wires being provided to ensure the power supply. Certain existing smart cards thus use the two free contacts of an ISO 7816 card to ensure the transfer of the data according to the USB standard.

For a conventional application, in the ISO 7816 smart cards, the used clock frequency is generally lower than 5 MHz. The clock signal is generated in an external device, then transmitted to the card by means of the contact CLK of the chip.

In a system using the USB protocol for audio/video stream processing, the clock frequency must not only be very accurate, but it must be relatively high. Generally, the clock frequency in USB mode is 30 MHz and the data transfer frequencies are 1.5 Mb/s (low speed) or 12 Mb/s (full speed) according to the USB 1 standard, and 480 Mb/s (high speed) according to the USB 2.0 standard. A high frequency and high precision impose the presence of an oscillator such as a quartz oscillator, which is integrated into the USB module itself. When the USB module takes the form of a smart card, constraints with respect to volume must particularly be respected. This makes the manufacturing of the card relatively complex and expensive.

Moreover, in a system capable of operating in ISO 7816 mode and in USB mode, it is necessary to manage very different frequencies in the most flexible possible way.

The document EP 1 457 922 describes a smart card that works in ISO 7816 mode and in USB mode, which is capable of switching automatically into the required mode. This automatic switching is carried out by means of the detection of a voltage on the contact D+ or D− of the chip. If a voltage is present on one of these contacts, it is considered that the smart card operates in USB mode. If no voltage is present on one of these contacts, the card operates in ISO 7816 mode.

This detection mode implies that it is first necessary to generate a voltage or to suppress the voltage on the contacts D+ and D− in USB mode in order to indicate to the card that there is a mode change. The required data can only be transmitted when the mode change has been taken into account. Such a constraint implies that this embodiment is not adapted to an application in which the mode changes frequently, in particular when there are frequent changes from ISO 7816 mode for the processing of control messages ECM to USB mode for the processing of the audio/video stream. According to a particular embodiment of this invention, the detection of the USB mode is carried out by imposing a logical 1 on the contact CLK. It is clear that in this case, the contact is no longer available.

The present invention proposes to solve the problems of the devices in the prior art by producing a security module capable of processing both the data according to the ISO 7816 standard as well as according to a high speed serial communication protocol such as the USB protocol. This security module is furthermore capable of switching automatically from one mode to the other, in a frequent and fast way.

Furthermore, this device removes the constraints related to the integration of an oscillator in a smart card. It is thus possible to produce a relatively cheap card while providing great flexibility of use.

DISCLOSURE OF THE INVENTION

The object of the invention is achieved with a device as defined in the preamble and characterised in that it includes a clock frequency detection module connected to a clock input of the 7816 interface, this detection module comprising means to distinguish the input frequency according to at least two different frequency ranges, one of said frequency ranges activating the high speed serial communication function.

The aim of the invention is also achieved by means of a process for processing an audio/video signal as defined in the preamble and characterised in that it includes the following steps:
    sending of a clock signal to a clock input of the ISO 7816 interface according to a preset frequency;
    determination of a frequency range to which said preset frequency belongs;
    determination of the operating mode of the security device according to the clock frequency determined range;
    processing of the data according to the determined operating mode.

This security module does not require an internal clock, while offering the possibility of functioning according to different modes. Moreover, the detection of the operating mode is carried out automatically, without it being necessary to impose a signal or to use a specific contact to signal a mode change.

BRIEF DESCRIPTION OF THE DRAWINGS

The present invention and its advantages will be better understood with reference to the enclosed drawings and to the detailed description of a particular embodiment, in which.

MODES FOR CARRYING OUT THE INVENTION

Figure 1:
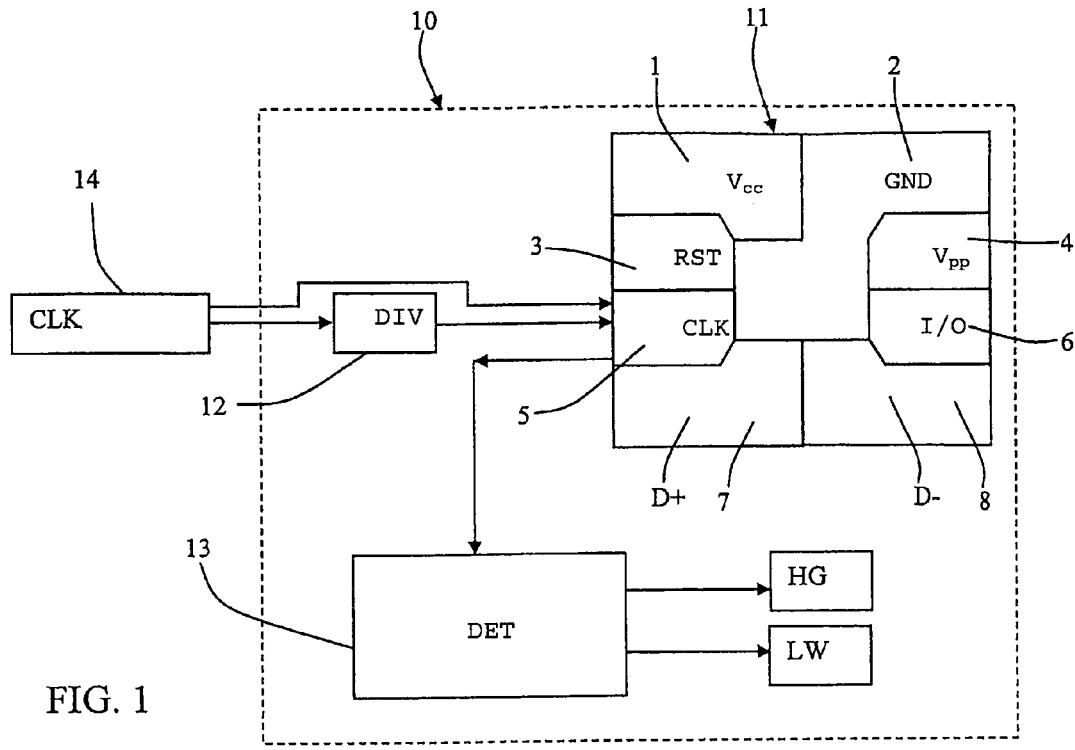
FIG. 1 schematically represents the security device according to a first embodiment of the present invention.
Figure 3:
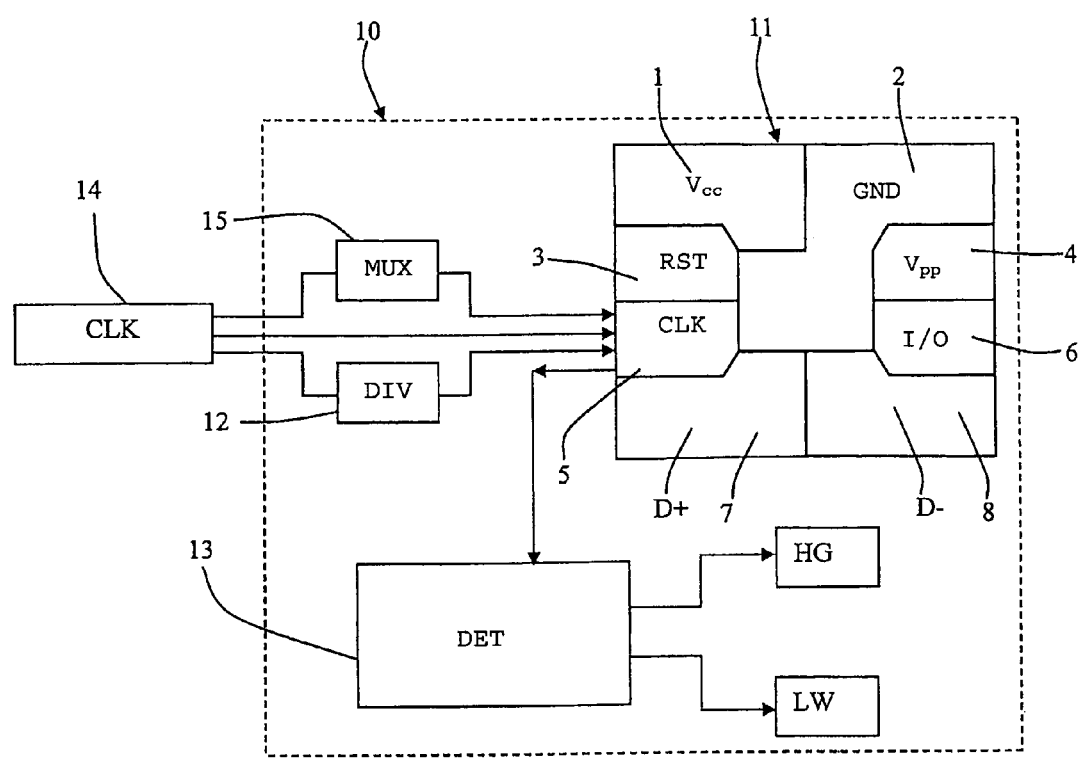

With reference to FIGS. 1 and 3, the security device 10 according to the present invention essentially includes a chip 11 fulfilling the ISO 7816 standard, a frequency divider 12 and a frequency detector 13.

The device also cooperates with a clock signal generator 14 that is placed on the exterior of the device. According to an example of a practical embodiment in which the device of the invention is used in the Pay-TV domain, the clock signal generator is placed in a decoder. This decoder also includes a smart card reader into which the invention device is introduced when the assembly is in operation.

The ISO 7816 standard notably defines that a chip conforming to this standard includes eight contacts, numbered from 1 to 8 in the Figures. The contact having reference 1 (Vcc) is responsible for providing the power supply of the card's chip. Contact 2 (GND) provides the grounding of this chip. Contact 3 (RST) allows resetting. Contact 4 (Vpp) provides the supply of the chip in programming voltage. Contact 5 (CLK) allows the input of a clock signal and contact 6 (I/O) allows the input/output of the data.

According to the embodiment in FIG. 1, the clock signal generator 14 generates signals at a sufficiently high frequency to allow operating in the mode requiring the highest frequency. In practice, it is possible to use different high speed serial communication protocols such as for example the USB protocol or a protocol called LVDS (Low Voltage Differential Signalling). Other high speed serial communication protocols could also be used. The following description is based on a concrete using a USB mode. The frequency is generally 30 MHz according to the USB standard. The signals for USB mode are thus generated outside of the card, by means of the generator, which is not subjected to volume constraints or any other constraints, these signals are then transmitted to the card on port 5 (CLK) of the chip. By using an external generator, it is possible to ensure good signal precision, which is essential for reliable operation in USB mode.

The security device according to the invention includes, as previously mentioned, a frequency divider 12. This is above all provided to divide the frequency in order to make it compatible with the mode requiring the lowest frequency, that is to say ISO 7816 mode. This frequency is generally in the range of 3 to 5 MHz. As it is well known, the frequency divider can be carried out by means of a counter, allowing the original frequency to be divided by any whole value, or by successive stages of frequency dividers dividing the frequency by 2, that allows the initial frequency to be divided by powers of 2. The frequency divider can also be arranged to divide the frequency generated by the signal generator in order to make it compatible with USB mode if the latter is too high.

The output of the frequency divider 12 is connected to contact 5 (CLK) of the chip in order to supply this chip with the required clock signal. As indicated in the Figure, it is possible to supply the clock signal either directly to the chip, or indirectly, that is to say after passing through the divider, according to the generated frequency and to the required frequency. It is also possible to use a frequency divider capable of carrying out different divisions according to necessity. According to a practical example, the generated frequency could be divided by 2 in order to allow operating in USB mode and by 12 to allow operating in ISO 7816 mode.

The security module according to the invention also includes a frequency detector 13 arranged to determine the clock frequency used or at least a frequency range. As an example, the detector can be foreseen not to detect the absolute frequency, but only to detect a frequency range. A first frequency range could be from 1 to 7 MHz corresponding to a low frequency marked LW, and a second frequency range from 15 to 45 MHz corresponding to a high frequency marked HG. Ideally, the two frequency ranges are separated, so that there is no risk of confusion possible between them. It is clear, according to the practical embodiment described above, that the high frequency range implies a USB operating mode while low range operation implies operating according to the ISO 7816 standard.

As already mentioned, other communication protocols could be used, associated with other frequencies. Such a usable protocol could be the LVDS (Low Voltage Differential Signalling).

Figure 2:
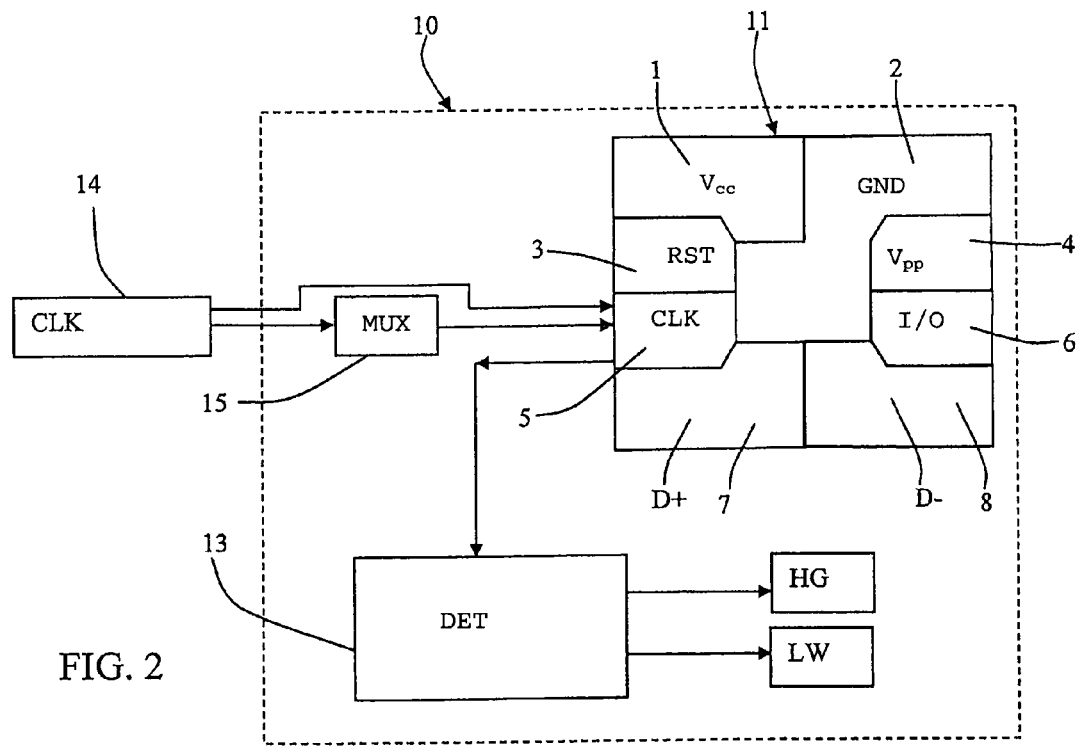
FIGS. 2 and 3 represent two other embodiments of the security device of the invention.

FIG. 2 shows an embodiment in which the security device of the invention includes a frequency multiplier 15 in place of the divider of FIG. 1. In this case, instead of using a clock signal generator that provides a frequency compatible with the operating mode requiring the highest frequency, the generator provides a signal having the lowest frequency. This signal can be sent directly to the chip in the case of operating according to the ISO 7816 standard or can be sent to the frequency multiplier. The latter then multiplies the frequency by a value that makes it compatible with operating in USB mode or in LVDS mode.

In the examples mentioned in the present application, it is indicated that the frequency in USB mode is 30 MHz. According to the frequency of the clock generator and the characteristics of the multiplier, the frequency with which the contact CLK of the chip is provided can be different to 30 MHz. Such a different frequency could be used since the decoder and the smart card both use the same frequency.

FIG. 3 shows a practical embodiment that is a combination of the embodiments of FIGS. 1 and 2. The security device simultaneously includes a frequency divider 12 and multiplier 15.

This device presents the advantage that it can be used indifferently with an apparatus generating a clock frequency compatible with USB mode or with an apparatus generating a clock frequency compatible with ISO 7816 mode. When the generated frequency corresponds to USB mode, the invention device uses the frequency divider to generate the clock frequency compatible with ISO 7816 mode. When the generated clock frequency corresponds to ISO 7816 mode, the device uses the frequency multiplier to generate a high frequency corresponding to the use mode conforming to the USB standard.

It is also possible to make provision for the signals generated by the clock signal generator to have an intermediate frequency between the frequency used in ISO 7816 mode and that corresponding to USB mode, for example 15 MHz. In this case, when the device operates in ISO 7816 mode, the signals of the clock signal generator are transmitted to the frequency divider before being sent to the card. On the contrary, when the device operates in USB mode, the signals of the generator are sent to the frequency multiplier before being sent to the card.

According to a variant, the smart card can support different serial communication modes such as for example USB and LVDS. The clock signal can be generated at a frequency required by the communication mode requiring the lowest frequency, i.e. the ISO 7816 mode. In this case, a first multiplication stage is used to generate a frequency that is compatible with the intermediate mode, i.e. the USB mode in our example. A second multiplication stage is further used to generate a higher frequency that is compatible with the mode requiring the highest frequency, i.e. the LVDS mode.

It is also possible to generate an intermediate frequency and to use a frequency divider to generate a lower frequency and a frequency multiplier to generate a higher frequency. Similarly, it is possible to generate a frequency at least as high as the frequency required for the mode requiring to highest frequency and to use two dividers to generate lower frequencies.

In all the cases, the incoming signal on the contact 5 of the chip is also transmitted to the frequency detector 13. This can therefore determine automatically the operating mode required according to the absolute frequency or a frequency range. In the embodiments of FIGS. 1 and 2, there is a high frequency corresponding to USB mode and a low frequency corresponding to ISO 7816 mode. As in the previous cases, the frequency ranges are separated so that there is no risk of confusion between them.

If several serial communication modes are used, a suitable number of frequency ranges must be foreseen. Ideally, these ranges are separated in order to differentiate the different communication protocols.

When the security device has determined in which operating mode it must work, it carries out the required operations in a conventional way. As soon as the clock frequency has changed, the operating mode also changes and the processing of the information is adapted consequently.

In the device according to the invention, there is no particular management of the operating mode of the chip. It is only necessary to act on the clock frequency so that this operating mode is immediately selected. This presents the advantage that it is possible to change the operating mode very frequently, which is necessary in particular in an application such as Pay-TV in which the change between the processing of the data stream requiring operating in USB or LVDS mode and processing the control messages requiring operating in ISO 7816 mode is frequent and must be fast.

The present invention has been described with reference to an embodiment in which the security device takes the form of a smart card. It is however also possible for this device to take another form, for example the form of a key or of any object.

According to a particular case, it is possible to foresee that one of the operating modes, for example the USB mode, is inactive by default and that it is necessary to send a particular command to activate this mode.

The invention claimed is:

1. A security device configured to be connected to a processing unit for an audio/video signal, the security device comprising:
   a device configured to decrypt an audio/video stream;
   a first interface configured to operate according to an ISO 7816 standard, the first interface including a clock input; and at least one second interface, the at least one second interface being a high speed serial communication interface, wherein, the at least one second interface includes the clock input of the first interface, and the security device includes a clock frequency detection module connected to the clock input, the clock frequency detection module including a device configured to distinguish an input frequency of the clock input according to at least two different frequency ranges, and to activate one of the first and second interfaces according to the frequency detected.

2. The security device according to claim 1, wherein the at least one second interface is of a USB type.

3. The security device according to claim 1, wherein the at least one second interface is of a Low Voltage Differential Signalling (LVDS) type.

4. The security device according to claim 1, wherein said at least one second interface includes security devices comprises one interface of a Low Voltage Differential Signalling (LVDS) type and one interface of a USB type.

5. The security device according to claim 1, wherein the security device includes at least one frequency divider configured to produce at least one lower frequency from a higher frequency.

6. The security device according to claim 1, wherein the security device includes at least one frequency multiplier configured to produce at least one higher frequency from a lower frequency.

7. The security device according to claim 1, wherein the security device includes at least one frequency divider configured to produce at least one lower frequency from an intermediate frequency, and at least one frequency multiplier configured to produce at least one higher frequency from an intermediate frequency.

8. A process for processing an audio/video signal via a security device having a device configured to decrypt an audio/video stream, an interface configured for an ISO 7816 standard including a clock input, and at least one high speed serial communication interface including the clock input, the process comprising:

sending a clock signal to the clock input according to a preset frequency;

determining a frequency range to which said preset frequency belongs;

determining an operating mode of the security device according to the determined clock frequency range; and processing the audio/video signal according to the determined operating mode.

9. The process for processing an audio/video signal according to claim 8, wherein the clock signal is sent at a high frequency and the signal having the high frequency is transmitted to the clock input through a frequency divider when the security device operates in a mode using a lower frequency.

10. The process for processing an audio/video signal according to claim 8, wherein the clock signal is sent at a low frequency and the signal having the low frequency is transmitted to the clock input through a frequency multiplier when the security device operates in a mode using a higher frequency.

11. The process for processing an audio/video signal according to claim 8, wherein the clock signal is sent to an intermediate frequency and the signal having the intermediate frequency is transmitted to the clock input through a frequency multiplier when the security device operates in a mode using a high frequency and the intermediate signal is transmitted to the clock input through a frequency divider when the security device operates in a mode using a low frequency.

12. The process for processing an audio/video signal according to claim 8, wherein the frequency range to which said preset frequency belongs corresponds to the use of the interface configured for the ISO 7816 standard.

13. The process for processing an audio/video signal according to claim 8, wherein the frequency range to which said preset frequency belongs corresponds to the use of the at least one high speed communication interface being of a USB type.

14. The process for processing an audio/video signal according to claim 8, wherein the frequency range to which said preset frequency belongs corresponds to the use of the at least one high speed communication interface being of a Low Voltage Differential Signalling (LVDS) type.

* * * * *